(12) United States Patent
Harper

(10) Patent No.: US 8,523,189 B2
(45) Date of Patent: Sep. 3, 2013

(54) SEALING ASSEMBLY

(75) Inventor: Cedric B. Harper, Derby (GB)

(73) Assignee: Rolls-Royce PLC, London (GB)

( * ) Notice: Subject to any disclaimer, the term of this patent is extended or adjusted under 35 U.S.C. 154(b) by 490 days.

(21) Appl. No.: 12/835,163

(22) Filed: Jul. 13, 2010

(65) Prior Publication Data

US 2011/0037233 A1    Feb. 17, 2011

(30) Foreign Application Priority Data

Aug. 14, 2009  (GB) .................................. 0914187.0

(51) Int. Cl.
*F16J 15/08* (2006.01)
(52) U.S. Cl.
USPC ........................................................ 277/650
(58) Field of Classification Search
USPC .................... 277/647, 650, 652–654
See application file for complete search history.

(56) References Cited

U.S. PATENT DOCUMENTS

| 4,817,970 A | 4/1989 | Krauss |
| 6,076,835 A * | 6/2000 | Ress et al. ...................... 277/637 |
| 2003/0122325 A1 * | 7/2003 | Aksit et al. .................... 277/647 |

FOREIGN PATENT DOCUMENTS

| EP | 0 903 519 A1 | 3/1999 |
| GB | 1 565 018 | 4/1980 |
| GB | 2 315 302 A | 1/1998 |

OTHER PUBLICATIONS

British Search Report dated Dec. 10, 2009 in corresponding British Patent Application No. GB0914187.0.

* cited by examiner

*Primary Examiner* — Gilbert Lee
(74) *Attorney, Agent, or Firm* — Oliff & Berridge, PLC

(57) ABSTRACT

A sealing assembly (100) for at least partially sealing a gap (102) leading to a void (104) between first and second members (110, 120), the first and second members forming part of a gas-washed surface of a jet engine, wherein the sealing assembly comprises: a bridging portion (130) couplable to one of the first and second members and movable to engage the other of the first and second members so as to block off the void between the first and second members from the gas-washed surface.

18 Claims, 5 Drawing Sheets

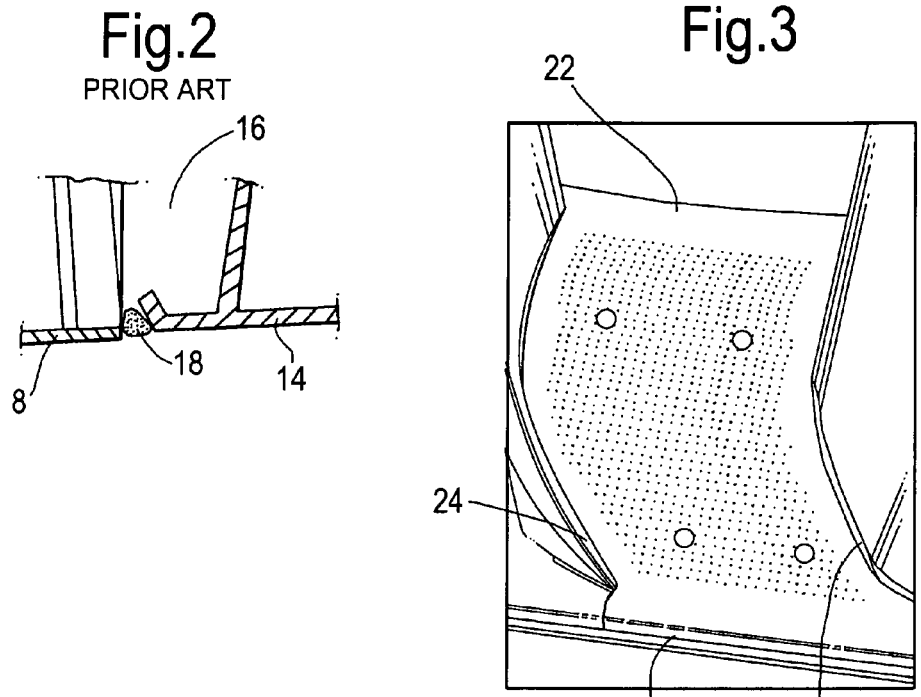
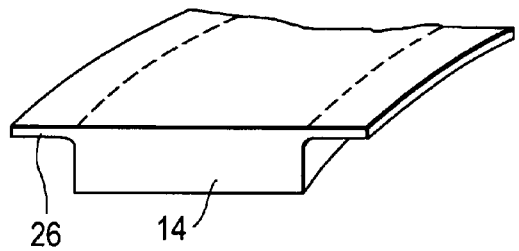
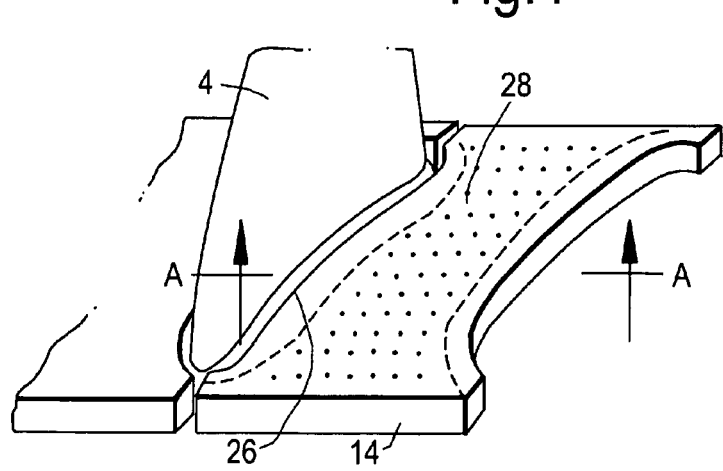

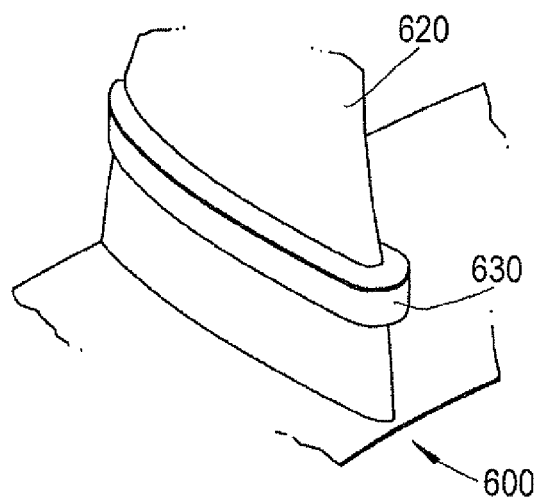
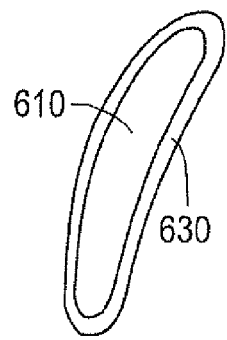
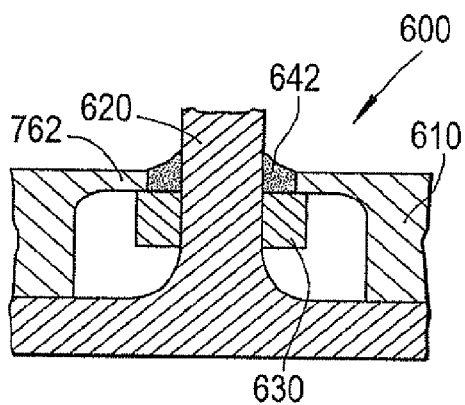
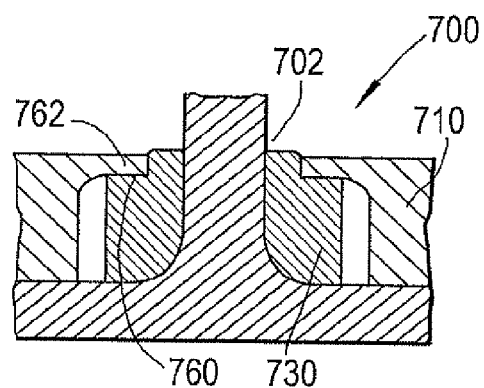

SEALING ASSEMBLY

BACKGROUND

This invention relates to a sealing assembly and particularly but not exclusively relates to a sealing assembly for a gas turbine.

SUMMARY

FIG. 1 shows a conventional mount ring 2 of a jet engine which is disposed about the fan outlet guide vanes 4. Attached to the forward face of the mount ring 2 is the front fan case 6 with front acoustic panels 8. Attached to the rearward face of the mount ring is the rear case 10 with rear acoustic panels 12. Between each fan outlet guide vane there are injection moulded infill panels 14, which form the gas washed surface. These are bolted to the mount ring via radial bolting. Gaps and voids are formed between the infill panels 14 and the neighbouring outlet guide vanes 4 and front and rear acoustic panels 8, 12. For example, a void 16 is formed where the front edge of the infill panel 14 interfaces with the front acoustic panel 8. Each infill panel 14 is acoustically treated, for example, the gas washed surface is perforated and the structure outboard of the infill panel is made up of honeycomb cells which attenuate sound waves and forms the acoustic treatment.

As shown in FIG. 2, following fitment of all the infill panels 14, any gaps or voids are filled with filler 18, for example polysulphide or any other sealant to make up the gas washed surface. In particular, the circumferential gaps 20, 22 forward and aft of the infill panels 14, and the gaps 24 between the surfaces of each vane 4 and the infill panel 14 are also filled with filler (see FIG. 3).

When injecting filler 18 into gap 20 to seal the circumferential gap 20 forward of the infill panels 14, it is possible to completely fill the void 16. This can also apply to the gaps 24 and associated voids around each vane 4. It is difficult to control how much filler is used and as a result large quantities of filler are typically used around the circumference alone. Accordingly, this adds excess weight, increases lead time and cost. Furthermore, the resultant large volume of filler can take a long time to cure and is also likely to shrink during curing. Shrinkage of the filler may cause the filler to pull away from the surfaces instead of adhering.

Another problem is that the infill panels 14 have to fit between the fan outlet guide vanes 4, which typically incorporate cyclic stagger. Thus, to maintain a constant gap width between the vanes 4 and the infill panels 14, there may be many differently shaped infill panels 14. As a result, a greater number of spare parts have to be stocked and the likelihood of fitting the infill panel in the wrong position is increased.

Typically each infill panel is moulded using one mould tool and they are finish machined to differentiate them from one another. As shown in FIGS. 4 and 5 each infill panel comprises an overhang 26, which is machined to interface with a particular vane 4. FIG. 4 shows a region 28 (shown dotted) within the dotted lines denoting the overhang 26. The region 28 may be acoustically treated and it is desirable to maximise the area of this region as much as possible to attenuate noise. However, to ensure that one infill panel moulding suits all positions, the area of the acoustically treated region 28 is compromised.

The present invention therefore seeks to address these issues.

According to a first aspect of the present invention there is provided a sealing assembly for at least partially sealing a gap leading to a void between first and second members, the first and second members forming part of a gas-washed surface of a gas turbine, wherein the sealing assembly comprises: a bridging portion couplable to one of the first and second members and engaging the other of the first and second members so as to block off the void between the first and second members from the gas-washed surface the bridging portion being adapted to have a movable configuration in which relative movement between at least a part of the bridging portion and the other of the first and second members is permitted and a locked configuration in which relative movement between the at least a part of the bridging portion and the other of the first and second members is prevented.

The bridging portion may be slidably coupled to the first member such that the bridging portion may be slidably movable to engage the second member. The bridging portion may comprise a groove for receiving a corresponding tongue in the first member. The groove may be arranged such that the bridging portion may be slidably movable to engage the second member. Alternatively, the bridging portion may comprise a tongue for insertion into a corresponding groove in the first member. The tongue may be arranged such that the bridging portion may be slidably movable to engage the second member.

The bridging portion may comprise first and second ends for insertion into corresponding grooves in the first member. The ends may be arranged such that the bridging portion may be slidably movable to engage the second member.

The bridging portion may be integral to the first member. The bridging portion may be flexible with respect to the first member. The bridging portion may be resilient with respect to the first member. The bridging portion may be made up of a plurality of bristles.

The bridging portion may be slidably disposed about a perimeter of the second member. The bridging portion may comprise a shoulder adapted to receive a corresponding shoulder in the first member.

A turbomachine may comprise a sealing assembly as described above. A gas turbine may comprise a sealing assembly as described above.

In the locked configuration the bridging portion may be locked by a cured filler. The cured filler may contact the first and second members and the bridging portion.

According to a second aspect of the present invention there is provided a method of installing a sealing assembly for at least partially sealing a gap leading to a void between first and second members, the first and second members forming part of a gas-washed surface of a gas turbine, wherein the method comprises: providing a bridging portion coupled to one of the first and second members; and moving the bridging portion to engage the other of the first and second members so as to block off the void between the first and second members from the gas-washed surface, the bridging portion being adapted to have a movable configuration in which relative movement between at least a part of the bridging portion and the other of the first and second members is permitted and a locked configuration in which relative movement between the at least a part of the bridging portion and the other of the first and second members is prevented, applying a filler to the bridging portion and curing the filler to put the bridging portion into its locked configuration.

BRIEF DESCRIPTION OF THE DRAWINGS

The filler may be applied to the first and second members.

For a better understanding of the present invention, and to show more clearly how it may be carried into effect, reference will now be made, by way of example, to the accompanying drawings, in which:—

FIG. 2 shows an enlarged section of the prior art arrangement shown in FIG. 1;

FIG. 3 shows the gaps around the prior art infill panel;

FIG. 4 shows a perspective view of the prior art infill panel;

FIG. 5 shows a section of the infill panel corresponding to section AA shown in FIG. 4;

FIG. 12 shows a perspective view of a sealing assembly according to a sixth embodiment of the present invention;

FIG. 13 shows a sectional view of the sealing assembly according to the sixth embodiment of the present invention;

FIG. 14 shows a further sectional view of the sealing assembly according to the sixth embodiment of the present invention; and FIG. 15 shows a sectional view of a sealing assembly according to a seventh embodiment of the present invention.

DETAILED DESCRIPTION OF THE EMBODIMENTS

Figure 1:
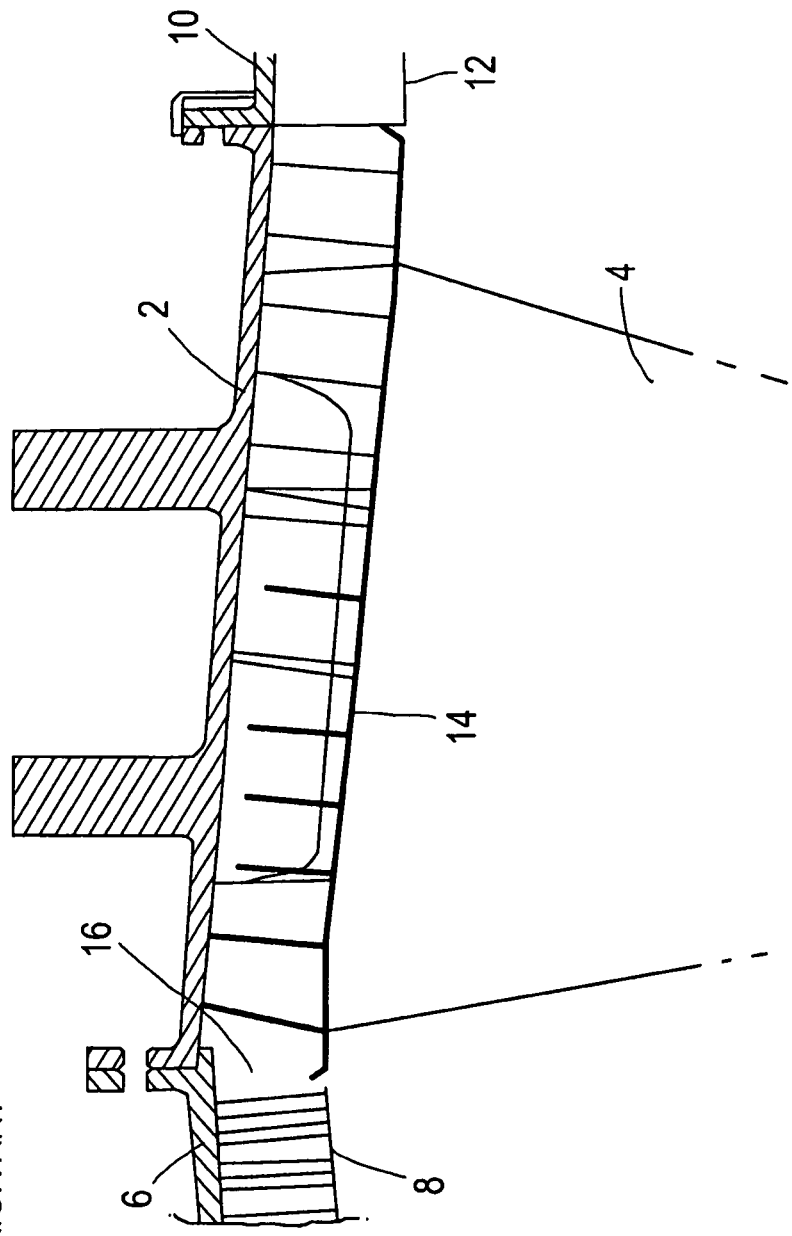
FIG. 1 shows a prior art arrangement of a sealing assembly for a gas turbine casing.
Figure 6:
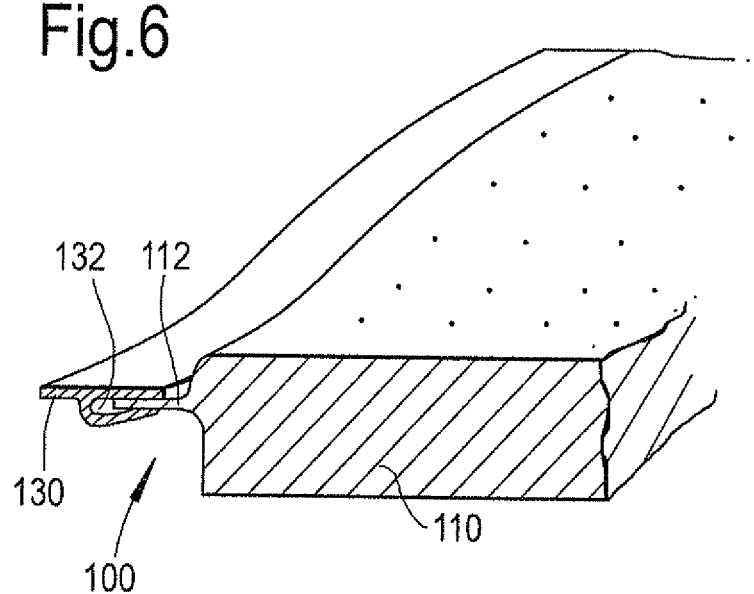
FIG. 6 shows a perspective view of a sealing assembly according to a first embodiment of the present invention.
Figure 7:
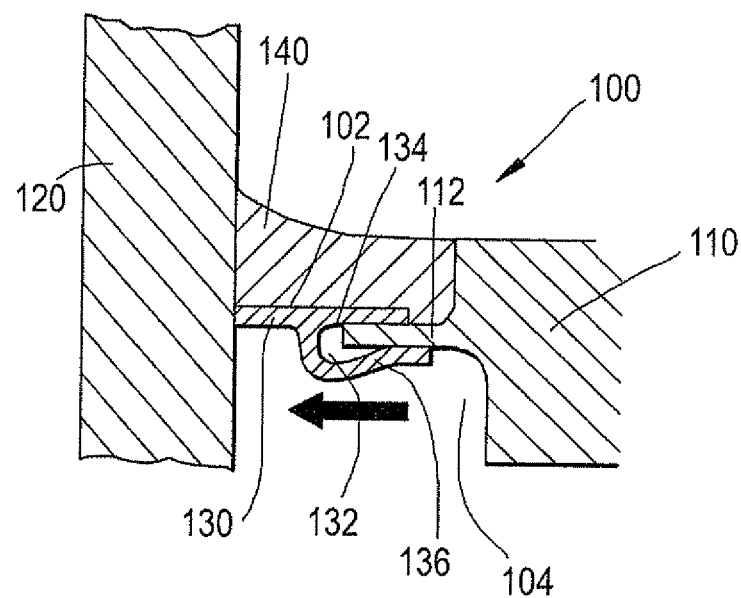
FIG. 7 shows a sectional view of the sealing assembly according to the first embodiment of the present invention.

With reference to FIGS. 6 and 7, a sealing assembly 100, according to a first embodiment of the present invention, is suitable for at least partially sealing a gap 102 leading to a void 104 between first and second members 110, 120. The first and second members 110, 120 may form part of a gas-washed surface of a gas turbine. For example, the first member may comprise an inner casing panel, which may be acoustically treated, and the second member 120 may comprise an aerofoil surface, for example a guide vane, or a further inner casing panel.

The sealing assembly 100 comprises a bridging portion 130 couplable to one of the first and second members 110, 120. In the case of the first embodiment, the bridging portion 130 is a separate component to the first member but is initially coupled to the first member 110 prior to installation of the first member 110. Furthermore, the bridging portion 130 is movable to engage the other of the first and second members 110, 120 so as to block off the void 104 between the first and second members from the gas-washed surface.

In the case of the first embodiment, the bridging portion 130 is slidably coupled to the first member 110 such that the bridging portion is slidably movable to engage the second member 120. The bridging portion 130 comprises a profiled edge to match the interface with the second member 120. The bridging portion 130 comprises a groove 132 for receiving a corresponding tongue 112 in the first member 110. The groove 132 is arranged such that the bridging portion 130 is slidably movable to engage the second member 120.

The bridging portion 130 comprises a substantially flat portion 134 and a protruding part 136, which bends back with respect to the flat portion 134 so as to form the groove 132. The protruding part 136 is at least partially resilient and prior to installation the groove 132 is smaller than the tongue 112 of the first member 110. The protruding part 136 therefore provides a spring fit such that the bridging portion 130 clamps around the tongue 112 of the first member 110. The bridging portion 130 may be metallic or injection moulded. The first member may be fabricated from glass reinforced plastic and either metallic or NOMEX® honeycomb.

The bridging portion is initially clamped onto the tongue 112 of the first member 110 and after positioning the first member 110, the bridging portion is translated sideways until it is in contact with the second member. The gap 102 is then closed and the void 104 is then blocked off from the gas washed surface. A recess 140 between the first and second members 110, 120 on the gas washed side of the bridging portion may then be filled with filler 142 to create a smooth surface. The filler may be curable either by heat, chemical reaction, radiation or some other means to move it from an uncured flowable state into a cured non-flowable state. The filler is applied in its uncured state with the curing of the filler beneficially locking the bridging portion in place and inhibits any relative movement between the bridging portion and either the vane or panel. Preferred fillers are appropriate resins such as epoxy resins or polysulphide resins.

Figure 8:
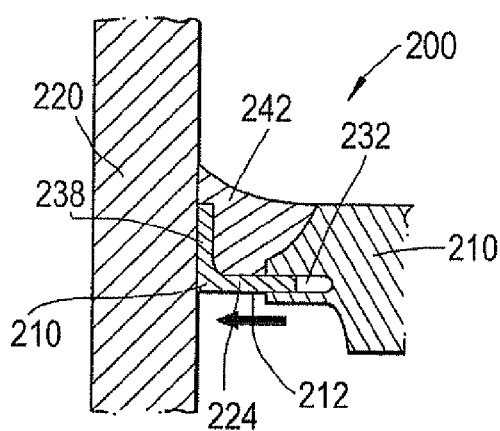
FIG. 8 shows a sectional side view of a sealing assembly according to a second embodiment of the present invention.

With reference to FIG. 8, a sealing assembly 200, according to a second embodiment of the present invention, is substantially the same as the sealing assembly 100 of the first embodiment. However, a bridging portion 230 of the second embodiment comprises a tongue 212 for insertion into a corresponding groove 232 in a first member 210. The tongue 212 is arranged such that the bridging portion is slidably movable to engage the second member 220. A substantially flat portion 234 of the bridging portion 230 may comprise the tongue 212.

The groove 232 is formed in an edge of the first member 210. The groove 232 may or may not be sprung such that the tongue 212 of the bridging portion 230 is held tight in the groove 232.

The bridging portion 230 may also comprise an angled portion 238 for abutting the second member 220. Although not shown, the same angled portion 238 may also be applied to the first embodiment.

As for the first embodiment, after the first member is positioned in place, the bridging portion 230 is moved out to contact the second member 220 and hence bridge the gap. Filler 242 may then be applied to make up the gas washed surface.

Figure 9:
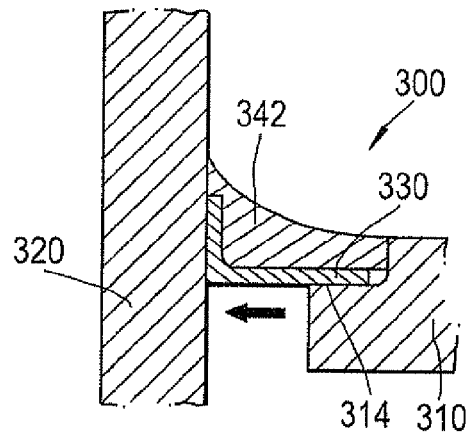
FIG. 9 shows a sectional side view of a sealing assembly according to a third embodiment of the present invention.

With reference to FIG. 9, a sealing assembly 300, according to a third embodiment of the present invention, is substantially the same as the sealing assembly 200 of the second embodiment. However, a first member 310 of the third embodiment does not comprise a groove as per the second embodiment. The bridging portion 330 of the third embodiment instead rests on a shoulder portion 314 of the first member 310. The bridging portion may then be moved into engagement with the second member 320 and may be bonded in this position using an adhesive, for example a fast setting adhesive such as Loctite®. Filler 342 may then be applied as before.

Figure 10:
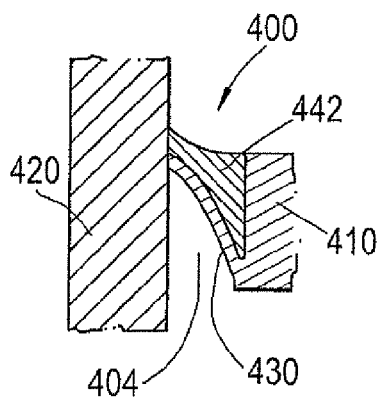
FIG. 10 shows a sectional side view of a sealing assembly according to a fourth embodiment of the present invention.

With reference to FIG. 10, a sealing assembly 400, according to a fourth embodiment of the present invention, differs from the preceding embodiments in that there are no sliding parts. The sealing assembly 400 comprises a bridging portion 430 which is integral to the first member 410. Furthermore, the bridging portion 430 is flexible and can flex with respect to the first member 410 and the bridging portion may be resilient and biased with respect to the first member. As such the bridging portion 430 is disposed so that it presses against the second member 420 in order to close the gap and block off the void 404. Filler 442 may then be applied as before.

Figure 11:
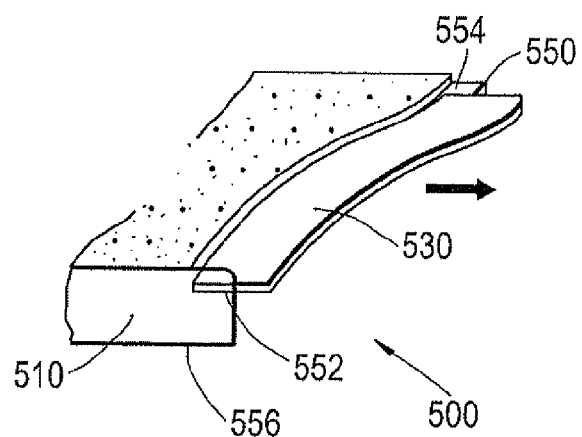
FIG. 11 shows a perspective view of a sealing assembly according to a fifth embodiment of the present invention.

With reference to FIG. 11, a sealing assembly 500, according to a fifth embodiment of the present invention, is similar in operation to the first and second embodiments. A bridging portion 530 is in the form of a seal plate and is profiled such that its edge fits against the surface of the second member (not shown in FIG. 11). The bridging portion 530 slides laterally like a drawer within channels 550, 552 which are provided at either end of the first member 510. The channels 550, 552 are provided in first and second end plates 554, 556, which protrude from either end of the first member 510. The first member may comprise an overhang portion (not shown) overhanging the bridging portion 530. The overhang portion ensures that a new gap is not formed between the bridging portion 530 and the first member 510 when the bridging portion slides towards the second member. The sliding bridging portion 530 can be made captive within the first member 510 by a slot and pin arrangement (not shown). For example, the bridging portion 530 may comprise one or more pins disposed at either end and the first member may comprise slots at either end for receiving the pins. The slots may be closed at both ends so that the pins are held captive within the slots. This slot and pin arrangement has the advantage of having one assembly number, rather than two separate parts. Filler may be applied as before.

With reference to FIGS. 12 to 14, a sealing assembly 600, according to a sixth embodiment of the present invention, comprises a bridging portion 630 coupled to a second member 620 and slidably disposed about a perimeter of the second member 620. The bridging portion 630 may be in the form of a ring and may be a pre-moulded foam seal. Prior to assembly, the bridging portion 630 is threaded over the second member, which may be an aerofoil surface such as a vane. The bridging portion 630 may be moved into a position in which the first member 610 may engage the bridging portion during assembly.

FIG. 13 shows a sectional view of the second member 620 with the bridging portion 630 disposed about its perimeter. During assembly the first member 610 is positioned into place and the bridging portion 630 is forced down the surface of the second member 620 by the first member 610 as shown in FIG. 14. The bridging portion 630 creates a floor for filler 642 to sit on.

With reference to FIG. 15, a sealing assembly 700, according to a seventh embodiment of the present invention, comprises a bridging portion 730 substantially the same as the bridging portion of the sixth embodiment. However, the bridging portion 730 of the seventh embodiment may comprise a shoulder 760 adapted to receive a corresponding shoulder 762 in the first member 710. The bridging portion 730 of the seventh embodiment may also be deeper in section than that of the sixth embodiment. When assembling the first and second members 710, 720 into position, the shoulder 760 on the bridging member 730 projects flush with the shoulder 762 of the first member 710.

Alternatively, the bridging portion 730 of the seventh embodiment may not comprise the shoulder 760. Instead, by forcing the bridging portion down on assembly, part of the bridging portion is displaced into the gap 702 between the first and second members, thereby filling the gap.

In a further embodiment the bridging portion may be made up of a number of flexible bristles. The bristles are movable in relation to the first or second members till aligned and correctly positioned before filler material is applied and cured to secure the bridging portion in position.

With any of the above described embodiments, the first and second members may form part of a gas-washed surface of a gas turbine. For example, the first member may comprise an inner casing panel such as an infill panel, which may be acoustically treated, and the second member may comprise an aerofoil surface, for example a guide vane, or a further inner casing panel. The forward edge of an inner casing panel may interface with the rearward edge of a further casing panel and the gap therebetween may also be filled by any of the assemblies described above. Similarly, the gap between a rearward edge of an inner casing panel and the forward edge of a further casing panel may also be filled by any of the assemblies described above. Likewise, the gap between an inner casing panel, for example an infill panel, and the edge of an aerofoil structure, for example a vane, may also be filled by any of the assemblies described above. Any of the panels or aerofoil structures may or may not be acoustically treated. The gas washed surface may be part of a thrust reverser.

The embodiments described above exhibit a number of advantages. These are summarised as follows:

The void area to be filled is controlled hence the amount of filler to be used will not exceed a recommended amount. This will create a weight and cost saving and a repeatable and more predictable process.

The weight of the total fan module will be more consistent. The curing time will also be more consistent. Thus, the material use and build time is more consistent and this helps to control costs.

The use of large quantities of filler is avoided, which will reduce curing times and minimise slump/shrinkage creating a better and more robust finish. This will also result in an improved aerodynamic performance.

The above-described sealing assemblies will introduce a reduction in lead-time during filler application.

A lower part count is required. For example, a variation in the aerofoil structure stagger angles can be accommodated by the sliding seal so there will be reduced part numbers.

The above-described sealing assemblies may be applied to any acoustic or non-acoustic joint. If acoustic treatment is applied then the zone of acoustic treatment can be increased and/or optimised for each and every member.

The sealing assemblies of the sixth and seventh embodiments may also reduce the part count. The inclusion of a bridging portion in form of a foam seal strip allows a large gap to be bridged, thereby reducing the number of infill panel variants required (for example to accommodate vane stagger).

The foam seal strip could also provide support for any overhanging part of the infill panel thus reducing vibration and possible subsequent failure.

The bridging portion surface may be in sections to accommodate cases where the aerofoil surfaces are different (i.e. not just a change in stagger angle).

The invention claimed is:
1. A sealing assembly for at least partially sealing a gap leading to a void between first and second members, the first and second members forming part of a gas-washed surface of a gas turbine, wherein the sealing assembly comprises:
a bridging portion couplable to one of the first and second members and engaging the other of the first and second members so as to block off the void between the first and second members from the gas-washed surface, the bridging portion being adapted to have a movable configuration in which relative movement between at least a part of the bridging portion and the other of the first and second members is permitted and a permanent locked configuration in which relative movement between the at least a part of the bridging portion and the other of the first and second members is prevented, wherein in the locked configuration the bridging portion is locked by a cured filler that directly contacts the first and second members and the bridging portion.

2. A sealing assembly as claimed in claim 1, wherein the bridging portion is slidably coupled to the first member such that the bridging portion is slidably movable to engage the second member.

3. A sealing assembly as claimed in claim 2, wherein the bridging portion comprises a groove for receiving a corresponding tongue in the first member, the groove being arranged such that the bridging portion is slidably movable to engage the second member.

4. A sealing assembly as claimed in claim 2, wherein the bridging portion comprises a tongue for insertion into a corresponding groove in the first member, the tongue being arranged such that the bridging portion is slidably movable to engage the second member.

5. A sealing assembly as claimed in claim 2, wherein the bridging portion comprises first and second ends for insertion into corresponding grooves in the first member, the ends being arranged such that the bridging portion is slidably movable to engage the second member.

6. A sealing assembly as claimed in claim 1, wherein the bridging portion is integral to the first member.

7. A sealing assembly as claimed in claim 1, wherein the bridging portion is flexible.

8. A sealing assembly as claimed in claim 7, wherein the bridging portion comprises a plurality of bristles.

9. A sealing assembly as claimed in claim 1, wherein the bridging portion is slidably disposed about a perimeter of the second member.

10. A sealing assembly as claimed in claim 9, wherein the bridging portion comprises a shoulder adapted to receive a corresponding shoulder in the first member.

11. A sealing assembly as claimed in claim 1, wherein the first and second members are movable relative to each other.

12. A gas turbine comprising a sealing assembly as claimed in claim 1.

13. A method of installing a sealing assembly for at least partially sealing a gap leading to a void between first and second members, the first and second members forming part of a gas-washed surface of a gas turbine, wherein the method comprises:

providing a bridging portion coupled to one of the first and second members, the bridging portion being adapted to have a movable configuration in which relative movement between at least a part of the bridging portion and the other of the first and second members is permitted and a permanent locked configuration in which relative movement between the at least a part of the bridging portion and the other of the first and second members is prevented, applying a filler directly to the first and second members and the bridging portion and curing the filler to put the bridging portion into its locked configuration.

14. A method according to claim 13, wherein the filler is applied to the first and second members.

15. A sealing assembly according to claim 14, wherein the first member is a vane and the second member is an infill panel.

16. A sealing assembly according to claim 14, wherein the bridging portion is a foamed material.

17. A sealing assembly according to claim 1, wherein the first member is a vane and the second member is an infill panel adjacent to the vane.

18. A sealing assembly according to claim 17, wherein the bridging portion is a foamed material.

* * * * *